Nov. 2, 1943.   C. F. GORR   2,333,171
DEVICE FOR PROPELLING BOATS
Filed March 22, 1943
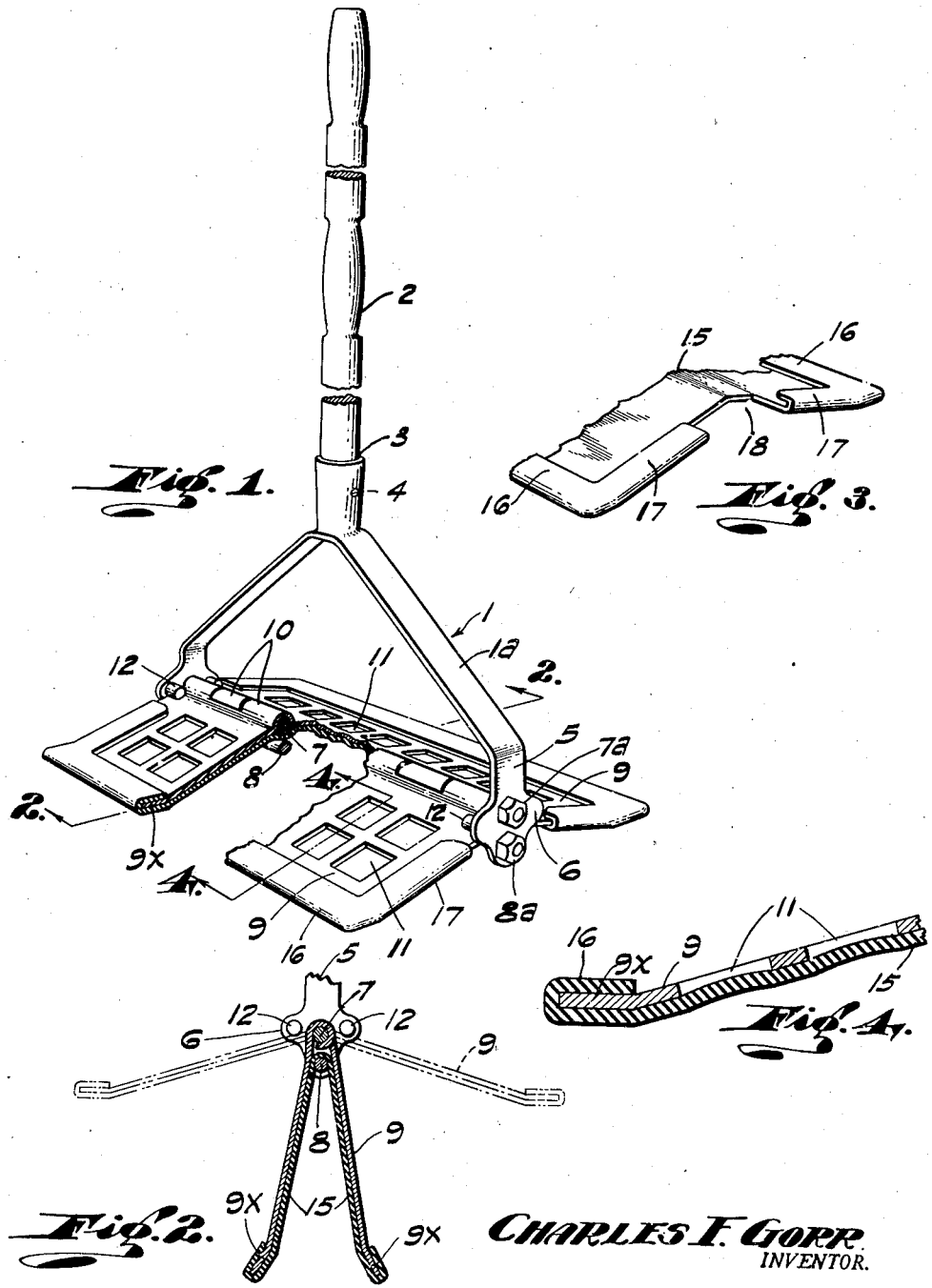
Charles F. Gorr
INVENTOR.

Patented Nov. 2, 1943

2,333,171

UNITED STATES PATENT OFFICE 2,333,171

DEVICE FOR PROPELLING BOATS

Charles F. Gorr, Orange, Calif.

Application March 22, 1943, Serial No. 479,969

9 Claims. (Cl. 9—24)

This invention relates to a device for propelling a boat.

More specifically speaking the invention pertains to a manually or mechanically operable push-and-pull handle to one end portion of which is secured a winged paddle element which automatically extends itself in the water, thus to act effectively thereon each time said handle is given a pushing movement, and which automatically folds so as but slightly act upon the water each time said handle is given a pulling movement.

In trolling for fish a small one man boat is frequently used which is too narrow at the point adjacent to its stern where the fisherman's seat is located for the use of the usual pair of oars by the occupant of the boat. But the single propelling implement provided by this invention may be conveniently operated under this condition to propel the boat at the desired speed. This implement may be operated in a noiseless manner with less water slip and by a single hand of the fisherman, leaving his other hand free to manipulate the fishing tackle.

One object of the invention is to provide an improved mounting means which is carried by a push-and-pull handle and which carries improved stop means properly to arrest the outswing of two cooperating wings of a paddle element at each propulsive movement of the push bar.

It is also an object of the invention to provide, as a new article of manufacture, a sheet of elastic material constructed in such a manner as to be mounted in a secure, but readily detachable manner, upon a boat-propeller paddle member having through it apertures to lighten its weight, the applied sheet constituting a web member which prevents the passing of the water through said apertures.

Another object of the invention is to provide an improved means for the hinging of the two wings of the paddle element to a common support.

Still another object is to provide in a paddle element an improved combination of skeletal, swingable wings and detachable covering of liquid impervious material for said wings.

Other objects, advantages and features of invention will hereinafter appear.

Referring to the accompanying drawing, which illustrates what is at present deemed to be a preferred embodiment of the invention, Fig. 1 is a perspective view of the complete device, the wings of the paddle member being extended, a portion of the device being broken away in order to disclose underlying structure. In this view portions of the handle are broken out in order to contract the length of the view.

Fig. 2 is a cross section through the paddle member and the carrier provided therefor, the plane of section being indicated by the line 2—2 of Fig. 1 including a fragment of the carrier fork. In this view the wings are shown in full lines in the inswing position and in dotted lines in the extended position.

Fig. 3 is a perspective view separately showing a fragment of the detachable cover sheet which partly envelops the wings of the paddle member.

Fig. 4 is a fragmental cross section of one of the wings of the paddle member on a larger scale, the plane of section being indicated by the line 4—4 of Fig. 1.

Referring in detail to the drawing, a paddle-carrying bifurcated member 1 is provided to be operated by a push-and-pull handle 2. Said bifurcated member has a socket 3 within which the handle is secured by means of a pin 4.

Each arm 1a of the bifurcation 1 has a downwardly (as viewed in Fig. 1) deflected portion 5 which terminates in an expanded or broadened portion 6. These broadened portions 6 each have at their mid-width an upper and a lower aperture which respectively receive a hinge rod 7 and a stop rod 8. Upon said hinge rod 7 are swingably mounted the pair of paddle wings 9, said wings having conventional curled ears 10 which extend around the rod 7 with a working fit and in a dovetailed relation to each other. The rods 7 and 8 are preferably made as elongated screw bolts respectively having screwed upon them the securing nuts 7a and 8a.

The paddle wings 9 are of a skeletal character, each being shown provided with a plurality of square apertures 11 shown arranged in checkerboard fashion. The outswing of said wings is limited by the two pairs of stop lugs 12 which project inwardly from the outer side portions of the broadened extremities 6 of the bifurcated member, the lugs of each pair being equally spaced outwardly from the mid-width of the arms 5. These four stop lugs are positioned to be contacted by the outer faces of the wings adjacent to the hinge rod 7.

A detachable wing cover made of elastic sheet material is provided said cover having an approximately rectangular body portion 15, two long side flaps 16 and four shorter end flaps 17. All these flaps are directed toward the same face of the cover, thereby adapting them to overlie edge portions of the outer faces of the paddle wings when the cover is in its applied position as shown in Fig. 1, at which time the end flaps 17, owing to their short character, overlie only the outer corner portions of the wings, leaving otherwise unobstructed spaces 18 between the flaps 17 to make room for the broadened portions 6 of the arms 5.

The outer edge portion 9x of each wing 9 is shown deflected, thus affording a better foothold for the edge portions of the attached sheet. The various flaps of the elastic (preferably rubber) sheet provide narrow pockets which closely grip edge portions of the wings 9 when the sheet is in its applied position, thus safeguarding efficiently against accidental displacement of said sheet.

The device may be operated alongside or astern of a boat, the paddle portion thereof being always kept under water during use. Whenever a push stroke is given by means of the handle 2 the wings 9 outspread to the positions shown in Fig. 1. On the pulling or idle strokes the pressure of the water upon the faces of the wings nearest to the handle 2 automatically inswings the wings with negligible resistance to their full line positions shown in Fig. 2. The stop rod 8 limits the extent of the inswing of each wing so as to prevent a very close approach of the wings toward each other, which might endanger their spreading apart properly upon the next propulsive movement being given to the handle 2. The outswing of the wings is limited by the four stop lugs 12 shortly before said wings occupy the same plane.

It will be seen that, when the handle is utilized to impart push strokes to the winged paddle member, the rubber sheet 15 will bulge into each of the wing apertures 11 (see Fig. 4) thus forming a multiplicity of depressions distributed over that face of each of the paddle wings which is being opposed to the water. These depressions in said face will stabilize the action of the device upon the water for they will lessen the tendency of undesirable sidewise movements thereof which I have termed earlier water slip. The rubber sheet will also prevent any part of the water from passing between the two wings 9 where they are connected with the hinge rod 7. The stop rod 8 prevents the cover from being bagged outwardly during the pull of the handle 2.

What is claimed is:

1. A push-and-pull member including a handle and a bifurcated member carried thereby, the space between the terminal portions of the bifurcations of said bifurcated member being bridged by two rods which extend in an adjacent substantially parallel relation to each other, the ends of said rods being fastened to said terminal portions of said bifurcations, one of said rods being a hinge rod and being located nearer to the handle than the other rod, the latter rod being a stop rod, paired paddle wings each having an inner edge portion swingably fastened to said hinge rod, said stop rod being positioned to arrest the inswing of said wings before they contact with each other, and a plurality of inwardly directed stop studs carried by the terminal portion of said bifurcations and positioned to arrest the outswing of said wings before they both occupy the same plane.

2. The subject matter of claim 1, and said bifurcations terminating in broadened plate portions which are substantially parallel to each other, and one of said inwardly projecting stop studs being carried by each of the opposite side portions of each of said broadened plate portions.

3. The subject matter of claim 1, and each of said wings being substantially rectangular and having through it a plurality of apertures, and a sheet of elastic material having edge portions with flaps whereby said sheet is attachable to said paired wings in a position wherein said sheet extends between said hinge rod and said stop rod.

4. A push-and-pull member including a handle and a bifurcated member carried thereby, the space between the terminal portions of the bifurcations of said bifurcated member being bridged by a rod, the end portions of said rod being fastened to said terminal portion of said bifurcation, a pair of paddle wings each having an inner edge portion swingably fastened to said rod, stop means carried by and contained within said bifurcated member, said wings being engageable with opposite sides of said stop means to limit their inswing, and additional stop means carried by said bifurcated member to limit the outswinging of said wings.

5. In a device of the kind described, a paddle member including wings having through them a multiplicity of apertures, a hinge rod forming a common pivot whereon said wings are swingably mounted, stop means limiting the swinging of said wings between extended and infolded positions, a push-and-pull handle operatively connected with said hinge rod and stop means, and a cover of elastic sheet material detachably securable to said paddle member in an overlying relation to the apertures of said wings, said cover sagging into said apertures and forming a multiplicity of depressions in that face of the paddle member which is opposed to the water whenever pushing movements are imparted to said handle.

6. The subject matter of claim 5, and said cover having marginal flaps forming pockets positioned to receive edge portions of said wings thereby detachably to secure said cover to said paddle member.

7. A device for propelling a boat comprising a handle, a paddle member having through it a multiplicity of apertures secured to said handle, and a cover of elastic material detachably securable to said paddle member in an overlying relation to the apertures of said paddle member.

8. The subject matter of claim 7 and, the side and end edge portions of said cover being provided with flaps all of which are directed to the same face of the cover.

9. The subject matter of claim 7 and, said cover having a marginal flap forming a pocket positioned to receive an edge portion of said paddle member.

CHARLES F. GORR.